No. 642,032. Patented Jan. 23, 1900.
J. W. WRIGHT.
APPARATUS FOR CLEANING DISHES.
(Application filed Oct. 23, 1899.)
(No Model.)

Witnesses:
Jas. E. Hutchinson.

Inventor.
John W. Wright,
By James L. Norris,
Attorney.

UNITED STATES PATENT OFFICE.

JOHN W. WRIGHT, OF LAMPASAS, TEXAS.

APPARATUS FOR CLEANING DISHES.

SPECIFICATION forming part of Letters Patent No. 642,032, dated January 23, 1900.

Application filed October 23, 1899. Serial No. 734,511. (No model.)

*To all whom it may concern:*

Be it known that I, JOHN W. WRIGHT, a citizen of the United States, residing at Lampasas, in the county of Lampasas and State of Texas, have invented new and useful Improvements in Apparatus for Cleaning Dishes, of which the following is a specification.

This invention relates to devices for cleaning dishes; and it has for its object to provide a novel, simple, efficient, and economical apparatus for rapidly, effectively, and safely washing dishes in a pail or vessel.

This object is accomplished in the manner and by the means hereinafter described and claimed, reference being made to the accompanying drawings, in which—

Figure 1:
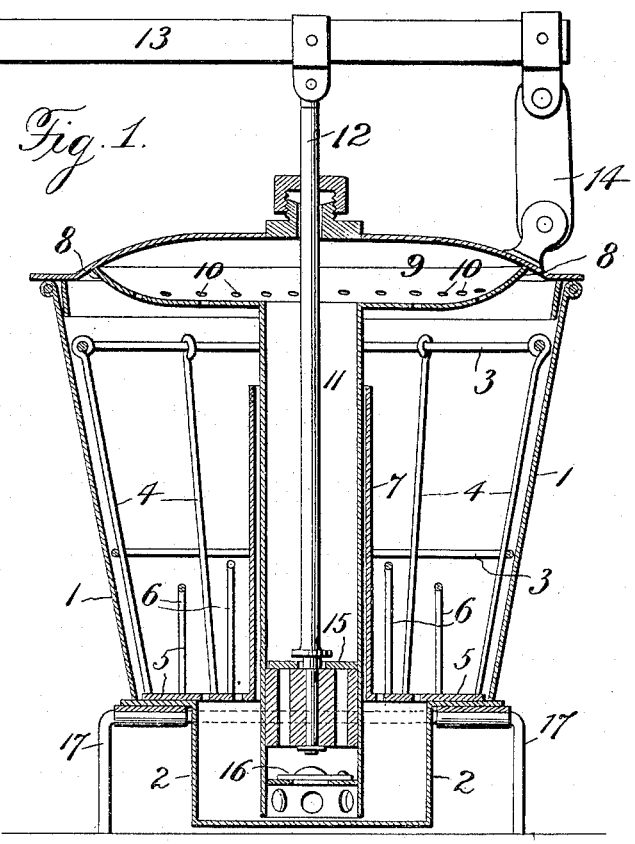
Figure 2:
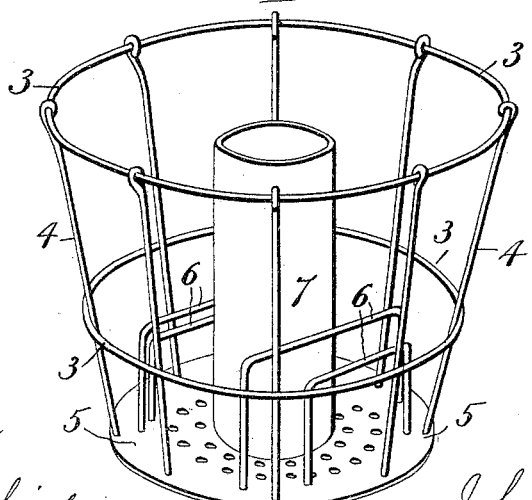

Figure 1 is a central vertical section through the complete device, and Fig. 2 is a perspective view of a basket or holder for the dishes.

The reference-numeral 1 indicates the pail, and 2 the reservoir depending from the bottom thereof, which reservoir is adapted to contain the boiling water for washing dishes. The device for holding and removing the dishes is shown in Fig. 2, and comprises two or more wire rings 3, connected by brace or upright wires 4, which latter are secured at their lower ends to a perforated plate 5. It will be seen that this device is in the form of a wire basket, of which the perforated plate 5 forms the bottom. Said basket is of a size to fit snugly within the pail, and when so located the perforated plate rests upon the bottom of the pail and extends over the pendent reservoir 2 thereof, as shown in Fig. 1. The top ring 3 of the basket extends nearly to the top of the pail 1, and serves as a handle for placing the basket or holder with the dishes therein within the pail and for removing the same therefrom after the dishes have been washed. Secured to the perforated plate 5 and extending upward therefrom are a series of vertical dish-supporting frames arranged parallel to one another and separated such distance apart that dishes may be inserted between them and held in an upright position for washing and also be prevented from moving about in the pail and being broken. The vertical dish-supporting frames are composed of wire bails 6, secured to the perforated plate 5. The number and arrangement of these bails may of course be varied. The plate 5 is provided in its central portion with a circular opening, secured about the edge of which and extending upward from said plate is a metal cylinder or pipe 7.

The numeral 8 indicates the lid of the pail, formed on the under side of which is a chamber 9, the bottom of which is perforated, as shown at 10.

The numeral 11 indicates a pump cylinder or barrel, the upper end of which is rigid with the bottom of the chamber 9 and communicates with said chamber.

The numeral 12 indicates the pump-rod, which works through a suitable stuffing-box in the lid and is pivotally connected to an operating lever arm or handle 13, which handle at one end is pivotally secured to the lid by means of a link 14. Said pump-rod at its lower end carries a valve 15 of the ordinary construction, and a flap or other valve 16 is located in the lower end of the pump-cylinder 11. When the lid is in position on the pail, the pump-cylinder extends downward through the cylinder or pipe 7 into the reservoir 2. The pipe 7 serves to guide the pump-cylinder and also to brace the same when in operative position.

The numeral 17 indicates a stand for the pail.

The operation will be readily understood. The basket or holder being filled with dishes is placed in the pail, the reservoir 2 having first been filled with water, and the lid, with the pumping apparatus attached thereto, is then placed in position. By operating the handle 13 the water is pumped up into the chamber 9 and forced through the perforations 10 thereof upon the dishes. The water flows down and through the perforations in plate 5 back into the reservoir 2, while the foreign substance removed from the dishes is held upon said plate. As the water is sprayed with considerable force upon the dishes, it requires but a short time to cleanse them, especially if the water employed be boiling hot. Two or more baskets or holders may be used with each machine, so that as fast as one lot of dishes is cleansed the basket containing them may be removed from the pail and the dishes allowed to drain, while a second basket of dishes may be inserted in the pail. This arrangement will facilitate the rapidity with which a given number of dishes may be cleansed.

Having thus fully described my invention, what I claim as new is—

1. A dish-washing apparatus, consisting of a pail having a central pendent water-reservoir at its bottom, a perforated plate supported on said bottom, extending over said reservoir and having a central opening coincident with the latter, a series of vertical dish-supporting bails secured to and rising from said perforated bottom and separated from one another to receive between them the dishes to be washed, a pail-lid fitting the pail and constructed with a water-chamber having a perforated bottom wall, a wire basket arranged in the pail and secured to and removable with said perforated plate, a pump-cylinder extending through the central opening in the perforated plate and having its upper end communicating with the water-chamber in the pail-lid, a plunger working in the pump-cylinder, a rod connected with the plunger, and a lever for working the rod, substantially as described.

2. A dish-washing apparatus, consisting of a pail having a central pendent water-reservoir at its bottom, a perforated plate supported on said bottom, extending over said reservoir and having a central opening coincident with the latter, an upright pipe arranged in the center of the pail and rising from the central opening of the perforated plate, a series of vertical dish-supporting frames secured to and rising from said perforated plate at opposite sides of said pipe and separated from one another to receive between them the dishes to be washed, a pail-lid fitting the pail and constructed with a water-chamber having a perforated bottom wall, a wire basket arranged in the pail and secured to and removable with said perforated plate, a pump-cylinder arranged in said pipe, extending through the central opening in the perforated plate into said reservoir and having its upper end communicating with the water-chamber in the pail-lid through the perforated bottom wall thereof, a plunger working in the pump-cylinder, a rod connected with the plunger, and a hand-lever for working the rod, substantially as described.

In testimony whereof I have hereunto set my hand in presence of two subscribing witnesses.

JOHN W. WRIGHT.

Witnesses:
D. G. PRINCE,
T. U. SPARKS.